United States Patent
Lawson et al.

(10) Patent No.: US 8,321,523 B1
(45) Date of Patent: Nov. 27, 2012

(54) METHOD AND APPARATUS FOR DYNAMICALLY AND INCREMENTALLY MODIFYING NIS MAPS

(75) Inventors: Craig L. Lawson, Campbell, CA (US); Paul Moore, Mercer Island, WA (US)

(73) Assignee: Centrify Corporation, Mountain View, CA (US)

( * ) Notice: Subject to any disclaimer, the term of this patent is extended or adjusted under 35 U.S.C. 154(b) by 1672 days.

(21) Appl. No.: 11/410,543

(22) Filed: Apr. 24, 2006

(51) Int. Cl.
G06F 15/16 (2006.01)

(52) U.S. Cl. .......... 709/217; 709/223; 709/224; 714/39; 714/47.1; 370/252

(58) Field of Classification Search .................. 709/217, 709/223, 224; 714/39, 47.1; 702/190; 370/252
See application file for complete search history.

(56) References Cited

U.S. PATENT DOCUMENTS

| | | | | |
|---|---|---|---|---|
| 5,826,253 A * | 10/1998 | Bredenberg | ...................... | 707/2 |
| 6,023,710 A * | 2/2000 | Steiner et al. | .......................... | 1/1 |
| 6,112,239 A * | 8/2000 | Kenner et al. | ................. | 709/224 |
| 6,205,122 B1 * | 3/2001 | Sharon et al. | ................. | 370/254 |
| 6,633,835 B1 * | 10/2003 | Moran et al. | ................. | 702/190 |
| 6,691,209 B1 * | 2/2004 | O'Connell | ..................... | 711/114 |
| 6,801,940 B1 * | 10/2004 | Moran et al. | .................. | 709/224 |
| 7,753,268 B1 * | 7/2010 | Robinson et al. | ............. | 235/383 |
| 7,925,729 B2 * | 4/2011 | Bush et al. | ..................... | 709/223 |
| 7,984,488 B2 * | 7/2011 | Cross et al. | ........................ | 726/6 |
| 8,185,651 B2 * | 5/2012 | Moran et al. | .................. | 709/235 |
| 2002/0039352 A1 * | 4/2002 | El-Fekih et al. | .............. | 370/252 |
| 2003/0172145 A1 * | 9/2003 | Nguyen | ......................... | 709/223 |
| 2007/0165541 A1 * | 7/2007 | Arpee | ........................... | 370/254 |
| 2009/0019141 A1 * | 1/2009 | Bush et al. | ..................... | 709/223 |
| 2011/0167145 A1 * | 7/2011 | Bush et al. | ..................... | 709/223 |
| 2011/0167154 A1 * | 7/2011 | Bush et al. | ..................... | 709/224 |

OTHER PUBLICATIONS

Managing Linux Systems with Webmin System Administration and Module Development Jamie Cameron Prentice Hall Aug. 2003.*
RFC 2307 An Approach for Using LDAP as a Network Information Service L. Howard The Internet Society 1998.*
Active Directory for Microsoft Windows Server 2003 Technical Reference Stan Reimer, Mike Mulcare Microsoft Press 2003.*

* cited by examiner

*Primary Examiner* — Thu Ha Nguyen
(74) *Attorney, Agent, or Firm* — Blakely, Sokoloff, Taylor & Zafman (57) ABSTRACT

A method of maintaining Network Information Service (NIS) maps where modifying information about any of the network entities described by the NIS maps requires only incremental update of the NIS maps instead of full NIS map regeneration. A further method of detecting when network entity records on a network directory server change so that NIS map updates are necessary.

16 Claims, 11 Drawing Sheets

| NIS Map | Key | Value |
|---|---|---|
| hosts.byname | host name | IP address |
| passwd.byname | user name | account security information |
| passwd.byuid | user ID | account security information |
| group.byname | group name | group security information |
| networks.byname | network name | network IP address |
| services.byname | service name | service description |

710 — NIS Map
720 — Key
730 — Value

Figure 11

METHOD AND APPARATUS FOR DYNAMICALLY AND INCREMENTALLY MODIFYING NIS MAPS

BRIEF DESCRIPTION OF THE INVENTION

Embodiments of this invention maintain Network Information Service (NIS) maps and serve clients' queries from the data contained therein. An embodiment first creates the NIS maps (or recreates them during a complete rebuild) by processing and retrieving information contained in a directory database such as an LDAP database. An embodiment thereafter maintains the NIS maps by monitoring the directory database to detect record additions, deletions, and changes and updating the NIS maps incrementally to reflect added, deleted, and changed record data.

BACKGROUND

Network Information Service (NIS) is a standard developed to provide centralized information about network entities such as users, user groups, host computers, and services. A NIS server in the network stores information about these network entities and responds to queries from other computers. The inquiring computers are called NIS clients; their queries are NIS queries.

A NIS server runs a NIS process. The NIS process is responsible for responding to NIS queries and for reading stored NIS information to retrieve the information requested in the NIS queries. The NIS information on a NIS server is stored in one or more NIS maps.

Each NIS map is a table of entries that describes a set of the same type of network entities. Each entry in a NIS map describes a single network entity. Each entry is a key/value pair where the key is unique within the NIS map. The NIS process can search for a key within the NIS map and retrieve the value associated with a key. An example of a key/value pair is a computer host name associated with that host's Internet Protocol (IP) address.

One common example of a NIS map is named "hosts.byname". It contains entries for all host computers defined in the network. Each entry contains a unique host computer name as the key associated with a value that is the computer's IP address. This NIS map allows the NIS process to search for a host computer's IP address by supplying the name of the computer. Other NIS maps contain entries for users, user groups, services, and other network entities.

A NIS map is stored on the NIS server in a format that the NIS process can read. This format varies depending on how the NIS process retrieves data from NIS maps. A NIS map is typically stored in a simple database on the NIS server where NIS entries are stored as database records. Traditional NIS maps are read-only: that is, the NIS process can read information from the NIS map but it can't change information in the NIS map.

A NIS map is usually generated from an entity text file, which is a human-readable file that describes a set of network entities. Entity text files are typically common files defined by the UNIX operating system such as the /etc/passwd file, the /etc/hosts file, and the /etc/services file. Each of these files has a defined format and contains a set of entries that each describe a network entity. The /etc/hosts file, for example, contains a set of user entries that each contain the host computer's name and the computer's IP address along with other information that defines that computer.

To generate a NIS map, a network administrator typically executes a computer script that reads an entity text file and converts information there into one or more NIS maps. The script extracts information appropriate for each NIS map, creates a set of key/value pairs, and then writes them as a new NIS map in the format appropriate for the NIS process. For example, a NIS map script reads the /etc/hosts file for information about host computers, then creates the NIS map hosts-.byname. It contains key/value pairs that match host computer name with the computer's IP address.

Sometimes an entity text file provides information for two or more NIS maps. For example, a script can process the /etc/hosts file to create the hosts.byname NIS map and it can also process the same file to produce the hosts.byaddr NIS map. Hosts.byaddr permits the NIS server to respond to queries where the requester has a host's address and wishes to discover its name.

The NIS process does not use a newly generated NIS map until the network administrator or an administration process notifies the NIS process of the new map's availability.

When a network entity is created, modified, or deleted, the changes cannot be made directly to the read-only NIS maps on the NIS server. The changes are input instead into an entity text file used to generate NIS maps. A network administrator may enter the changes by hand, or an automated process may modify the entity text file.

Once the entity text file has been modified, the administrator or an executing script generates one or more new NIS maps from the file and then notifies the NIS process of the new maps' availability. The NIS process then uses the new NIS maps to retrieve information to respond to incoming NIS queries.

Many networks define thousands and thousands of network entities and require frequent entity information modification. Each set of modifications requires a change to the appropriate entity text files. Each of those text files must then be used to generate completely new NIS maps, which are stored in the NIS server and then, after the NIS process is notified, used to answer NIS queries. This process may require significant computing time and resources, often for insignificant changes in an entity definition.

As an example, consider a single host computer whose name has changed. To update the NIS server so that the new name is used to answer queries about the host computer, a network administrator or process must change the /etc/hosts file entry describing that host computer so that the entry contains the new computer name. After saving the revised text file, the administrator or process executes a script that reads the /etc/hosts file, containing thousands of entries, and generates a new hosts.byname NIS map. The administrator or process then notifies the NIS process of the locations of the new NIS map so the process will use it to serve revised information about the host computer's new name.

For a NIS server to provide the most up-to-date information for multiple NIS maps generated from multiple entity text files, these steps may occur daily or even hundreds, thousands, or more times each day. The frequency increases with the size of the network. And increasing network size also increases the number of entries processed each time a NIS map is updated.

SUMMARY OF THE INVENTION

An embodiment of this invention works on a NIS server that provides Network Information Service to a network of computers. The embodiment stores that information in a set of NIS maps. It makes complete NIS map regeneration unnecessary by working with a directory database such as an LDAP (Lightweight Directory Access Protocol) database that stores records for network entities. Whenever a new entity record appears in the database or an existing entity record is altered, an embodiment detects the change and makes the minimum necessary revisions to appropriate NIS maps. This allows the NIS server to provide up-to-date information about network entities without requiring complete NIS map regeneration.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

DETAILED DESCRIPTION OF THE INVENTION

This disclosure refers to network processes and data at several levels of abstraction. For precision and ease of reference, Applicants provide the following definitions, which will be used throughout the specification and in the claims.

Network entity is defined to be a user, user group, host computer, service, network, or other entity defined for network administration.

Network entity account is defined to be the set of data used to describe a network entity.

Network entity record is defined to be a database record that stores a network entity account. It is a type of information record.

Embodiments of this invention provide methods of working with network entity records in a directory database, of determining when new entity records appear in the directory database or existing entity records have been modified in the directory database, of incrementally modifying existing NIS maps to reflect entity record changes, and of reading those NIS maps to answer NIS queries from NIS clients.

An embodiment of this invention runs as the NIS process on a NIS server. It replaces a traditional NIS process such as the ypsery daemon. The embodiment requires access to a network directory database such as an LDAP database in which it can read network entity records. Each of those entity records contains a date and time when the record was last modified (a time stamp) or some equivalent indication of change such as a change serial number. Each record also contains a globally unique identification number (GUID) and a recycle flag. An entity record might be, for example, a user record that contains the user name, the user ID (UID), the user's password, the user's home directory, other standard user information, along with a time stamp, a GUID, and a recycle flag.

A system administrator can use a record administration interface to add, modify, and remove network entity accounts from the database and to work directly with network entity records in the database.

The record administration interface stores each network entity account in a corresponding network entity record. It may create new records when necessary to accommodate new accounts, but it does not delete records or change the GUID of any record. When an administrator uses the administration interface to remove a network entity account from the database, the interface does not delete the corresponding entity record. It marks the record as recyclable using the record's recycle flag. The interface may use any record marked as recyclable to store a new network entity account, overwriting any old data that may remain in the record. The record's GUID remains unchanged. This allows unused records to be re-used for new accounts and it ensures that any account deletions are visible to the NIS process.

Whenever the record administration interface modifies a record, it updates the record's time stamp or changes the serial number to reflect the current time and date or the relative order of the most recent record modifications.

The record administration interface can also organize network entity records into NIS map groupings. Each NIS map grouping contains logically related network entity records of the same entity type. It corresponds with a NIS map and its entries maintained for NIS service. The record administration interface may, for example, organize host computer records into a NIS grouping that corresponds to the entries in a hosts.byname NIS map.

An embodiment of this invention works as a NIS process that maintains a set of NIS maps in a local database. Each NIS map is stored as a set of read/write records in the database, one map entry per network entity record. Each NIS map entry contains a GUID that corresponds to the network entity it describes.

An embodiment of this invention periodically checks the directory database. It looks within NIS groupings created by the record administration interface for any entity records whose time stamps or change serial numbers show the records were modified, added, or recycled since the last check. The embodiment retrieves these records. The information in each record includes a GUID and a recycle flag.

The embodiment uses the GUID in retrieved records to find corresponding NIS map entries in the local database if they exist and then to revise their contents. If a GUID has no corresponding entry, the embodiment creates a new NIS map entry in a NIS map that corresponds to the NIS grouping in which the record was associated on the directory server. The embodiment stores the appropriate key/value pair and GUM there. If entity information includes a recycle flag that indicates that the entity's record is recycled, the embodiment deletes the corresponding NIS map entry so that its information is not retrieved for NIS queries.

An embodiment of this invention accepts NIS queries from NIS clients, finds requested information if possible in the NIS maps stored in the local database, and responds with requested information, all in the same manner that a standard NIS process would respond to NIS queries. If a NIS client requests successive entries in a NIS map by asking for the next entry and the next and so on (a standard service offered by a NIS server), the embodiment can iterate correctly through the entries in the stored NIS map.

Another way to implement the invention is to create an embodiment that replaces the standard NIS process on a NIS server but that does not maintain its own NIS maps. It relies instead on NIS map data stored in the directory server. When a NIS client requests NIS data from the NIS process, the embodiment requests a NIS entry directly from the directory server, then returns the retrieved data to the NIS client.

This implementation requires the directory server to add an additional piece of data to entity records: a unique index number within a NIS map. If a NIS client requests successive entries from a NIS map, the index number allows the embodiment to iterate correctly through the NIS entries stored on the directory server. While this implementation is not currently as efficient or reliable as the previous implementation, advances in network technology and processing power may make it more efficient and reliable in the future.

Figure 1:
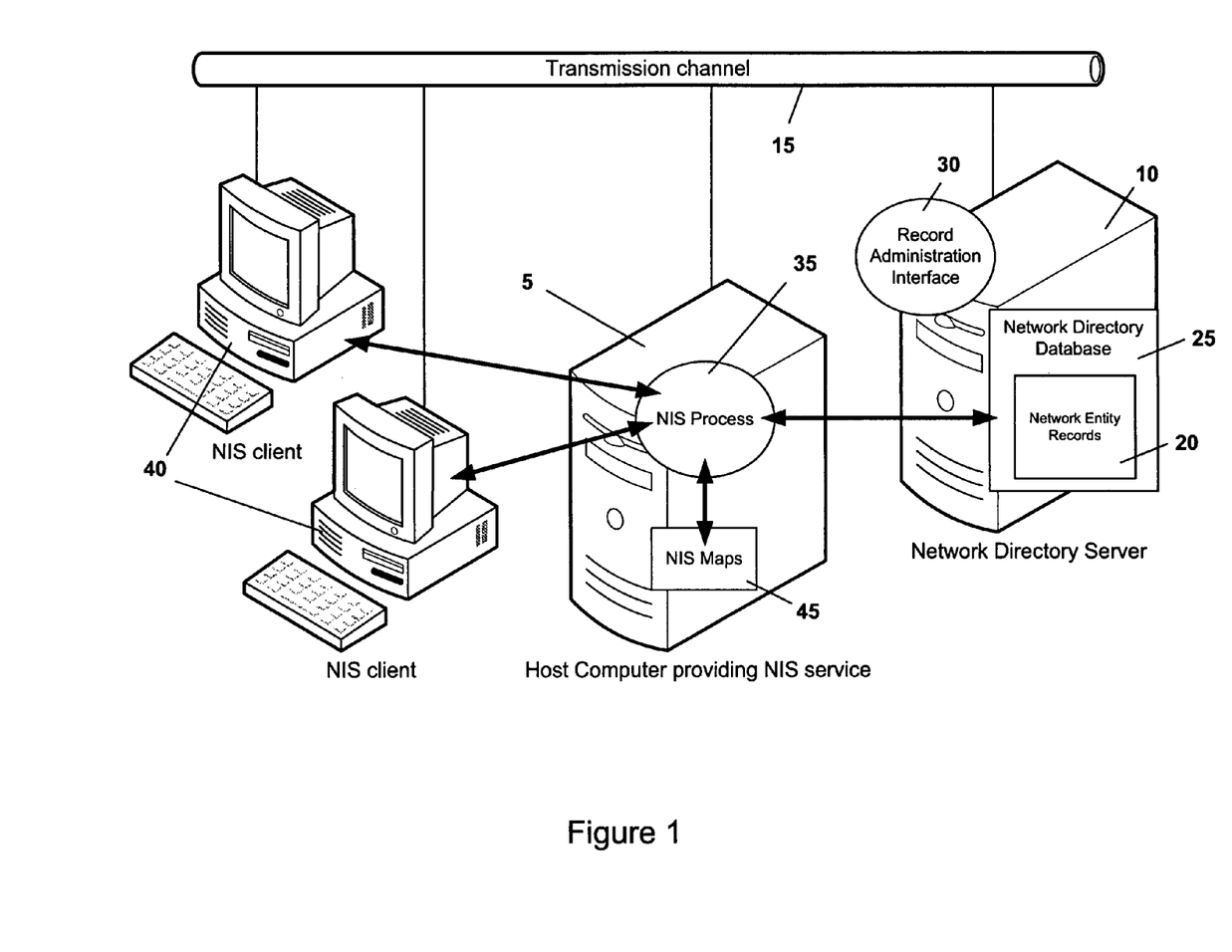
FIG. 1 illustrates how embodiments of the invention run on a host computer and a network directory server and how they respond to NIS clients.

FIG. 1 illustrates a host computer (5) providing NIS service and a network directory server (10) that may be operated in accordance with an embodiment of the invention. The host computer and network directory server are in communication through a transmission channel (15).

The transmission channel (15) can be any wired or wireless transmission channel such as an Ethernet or Wi-Fi network.

The network directory server (10) can use any directory technology that provides a database that stores information records. That technology might be Microsoft's Active Directory, LDAP service, a relational database, or any other directory technology. The network directory server can be a single server or a set of servers that supply unified directory service to the network. The network directory server can provide directory service to one or more computers.

The network directory server stores a set of information records, in this case network entity records (20) associated in NIS groupings in a network directory database (25). Each network entity record stores information about a single network entity such as a user, a user group, a host computer, or a service available to computers and users. That information typically includes the name of the network entity and entity data along with a set of data required by embodiments of the invention.

A record administration interface (30) allows a network administrator to add, modify, and remove network entity accounts by working with network entity records (20) in the network directory database (25). The record administration interface (30) may run on the network directory server (10) or on another computer that is in communication with the network directory server.

The host computer providing NIS service (5) runs an embodiment of this invention that is implemented in this example as a NIS process (35), a process that runs on the host computer and responds to NIS requests from NIS clients (40). The NIS clients send their NIS requests through the transmission channel (15).

Non The NIS process (35) maintains a set of NIS maps (45) in a locally accessible database. The NIS maps (45) contain local copies of the network entities whose records are stored in the directory database (25). The NIS process (35) reads those NIS maps (45) to retrieve information requested by NIS queries. The NIS maps are described later in this document. In another implementation of this invention, the NIS process (35) does not maintain NIS maps in a locally accessible database. It relies instead on reading network entity records (20) directly from the network directory database (25) to respond to each NIS query.

Figure 2:
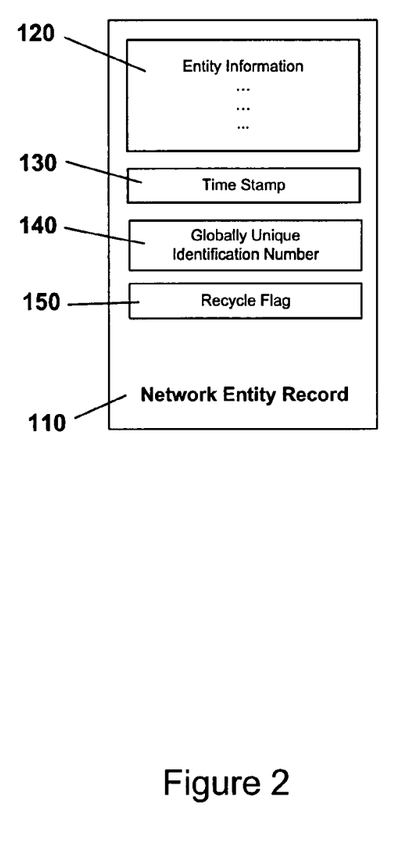
FIG. 2 illustrates the structure of an entity record stored in the network directory database.

FIG. 2 illustrates the structure of a network entity record (110), a type of information record stored in a network directory database on a network directory server. The record contains entity information (120) that is standard for an entity of its type. A user group record, for example, may contain standard entity information that includes the user group name, the group identification number, the group password, and the group's membership list. Each network entity record (110) contains three additional pieces of information used by an embodiment of this invention: a time stamp (130), a globally unique identification number (GUID) (140), and a recycle flag (150).

The time stamp (130) is a value that indicates the sequence in which network entity records are modified or created. The time stamp is typically the date and time that the modification took place. It may also be a sequential number assigned to the time stamp of a network entity record when the record is created or modified. For example, a newly created record is assigned a time stamp number of 3956. A record modified immediately after that is assigned a time stamp number of 3957. When the newly created record is modified immediately after that, it is assigned the time stamp number of 3958 to replace its original time stamp number of 3956. A process can examine the time stamps of a set of network entity records and determine the order in which the records were created or modified.

The GUID (140) is simply a number guaranteed to be unique among all GUIDs assigned to network entity records within the network entity database. A GUID is guaranteed to identify a single network entity record within the network entity database.

The recycle flag (150) is a value that specifies either of two states for its network entity record: the record is available for recycling, or the record is not available for recycling. A record available for recycling is, in essence, an empty record. Any entity information it contains is not valid. When a network entity account is removed from the network entity database, its network entity record is not removed from the database. The record is simply marked for recycling instead. When a network administrator adds a new network entity account to the database, it is written into a record available for recycling if such a record exists. The record's GUID remains constant throughout the recycling process. Its time stamp is updated when the record is recycled because recycling is a form of record modification.

Another implementation of this invention does not maintain NIS maps where they're locally accessible to the NIS process. This implementation requires an additional piece of information in each network entity record: an index number that is unique within each NIS map grouping of network entity records stored in the network directory server. The index number orders the records within a NIS map grouping so that if the NIS process requests sequential records from the grouping the network directly server can respond appropriately.

Figure 3:
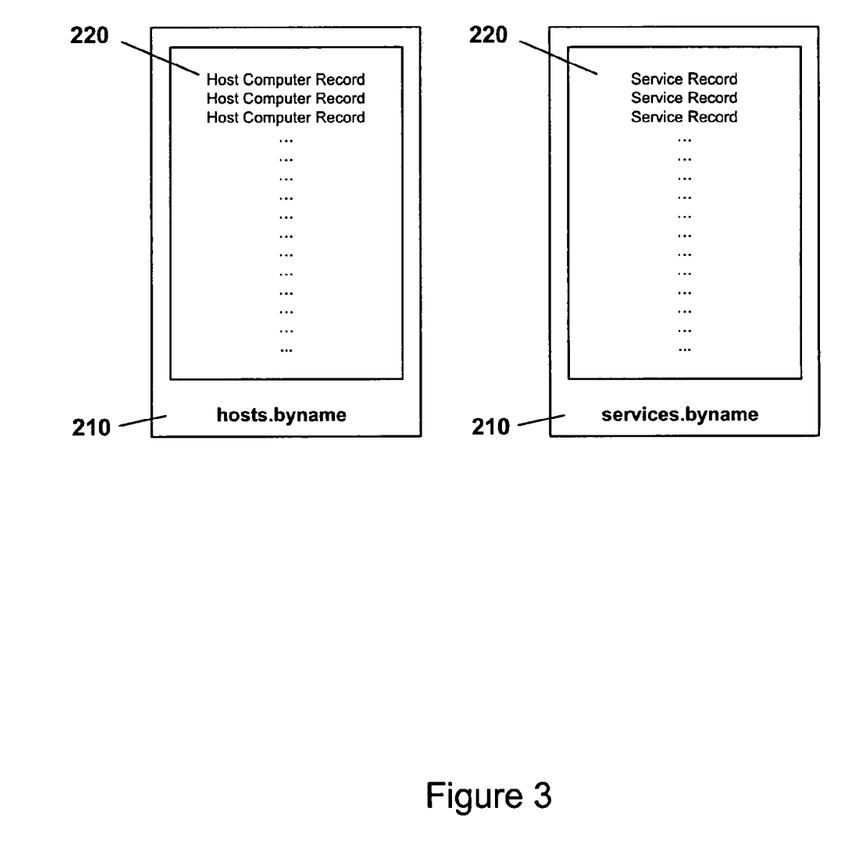
FIG. 3 illustrates a NIS grouping created by an embodiment of the invention.

FIG. 3 illustrates examples of two NIS groupings (210) created by the record administration interface. A grouping may be created by using a container in a network directory server that is implemented using Active Directory, a table in a server that is implemented using a relational database, or other methods in other types of servers. A NIS grouping identifies the NIS map maintained by a NIS process that the NIS grouping corresponds to. In these examples, one grouping identifies hosts.byname as its corresponding NIS map, the other identifies services.byname as its corresponding NIS map. Each grouping contains network entity records (220) appropriate for the NIS map. The hosts.byname NIS grouping, for example, contains host computer records, while the services.byname grouping contains service records.

Figure 4:
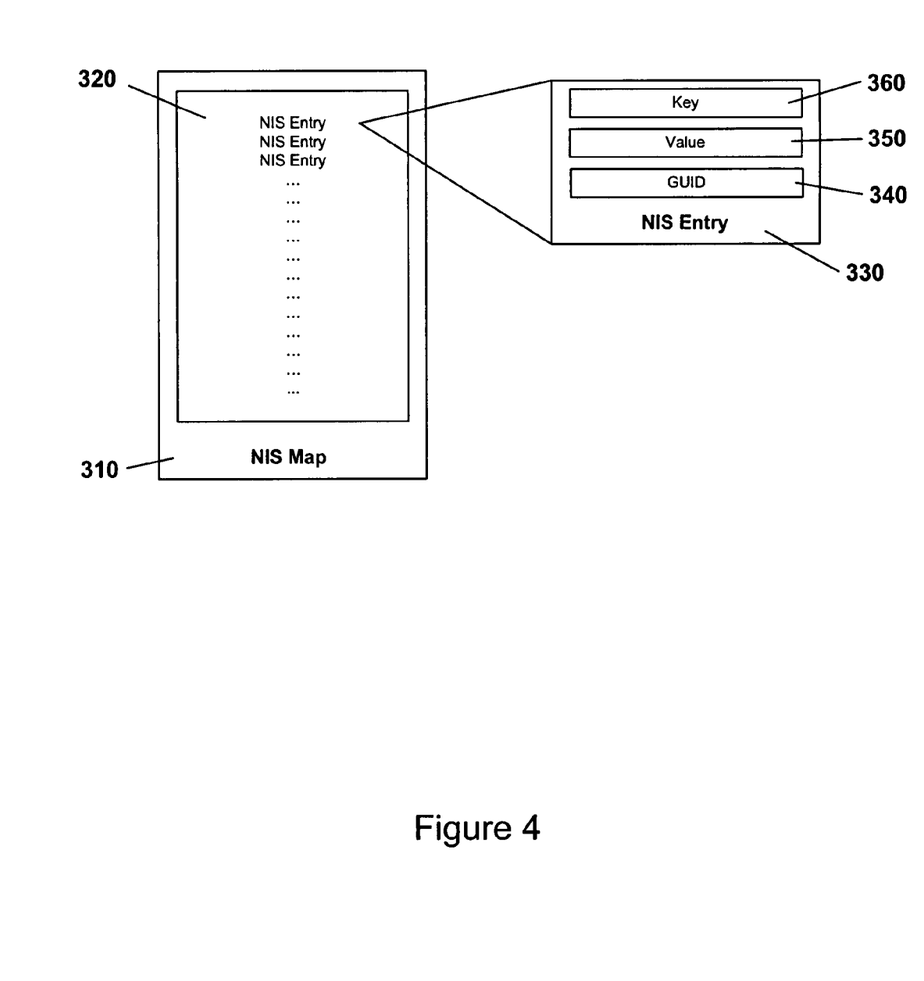
FIG. 4 illustrates the structure of a generic NIS map entry maintained by an embodiment of the invention.

FIG. 4 illustrates a NIS map (310) maintained by an embodiment of the invention running on a host computer providing NIS service. The embodiment initially creates the NIS map by copying a plurality of information records (network entity records in this case) from the network directory server database. It does so by requesting from the database all network record entity records in the NIS grouping that corresponds to the NIS map on the host computer.

The NIS map (310) contains a set of custom NIS entries (320) that are very similar to the NIS entries served by a conventional NIS server. A NIS entry (330) maintained by an embodiment of the invention contains a key component (360) and a value component (350) that describe a single network entity along with a GUID (340). This GUID is the same GUID that is associated with that network entity in its network entity record stored by the network directory server.

Note that a different implementation of the invention may not maintain its own NIS map but relies instead on retrieving NIS map entries directly from the network directory server.

Figure 5:
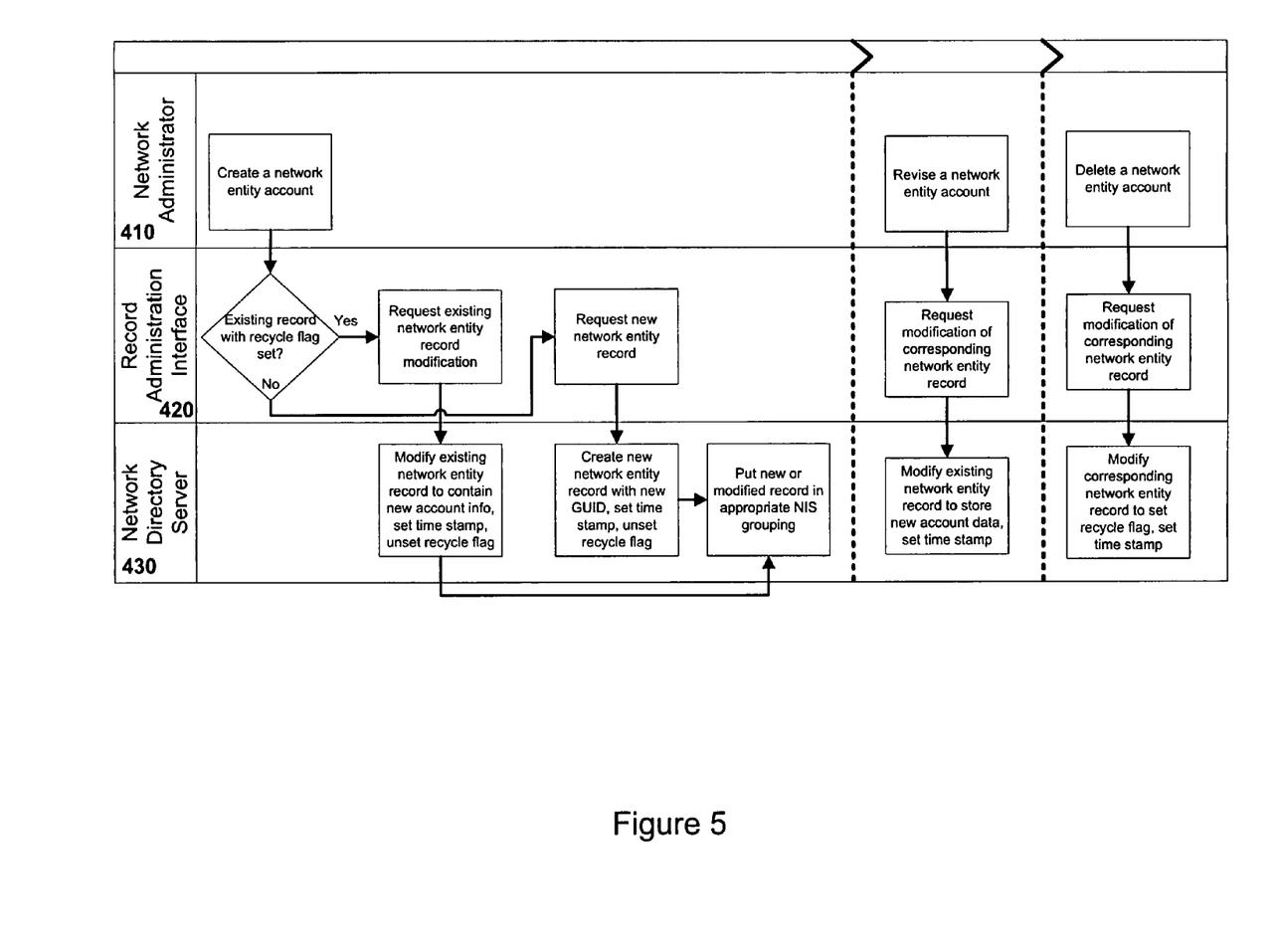
FIG. 5 illustrate the process that occurs when a network administrator adds, modifies, or deletes a network entity account in the network directory database.
Figure 6:
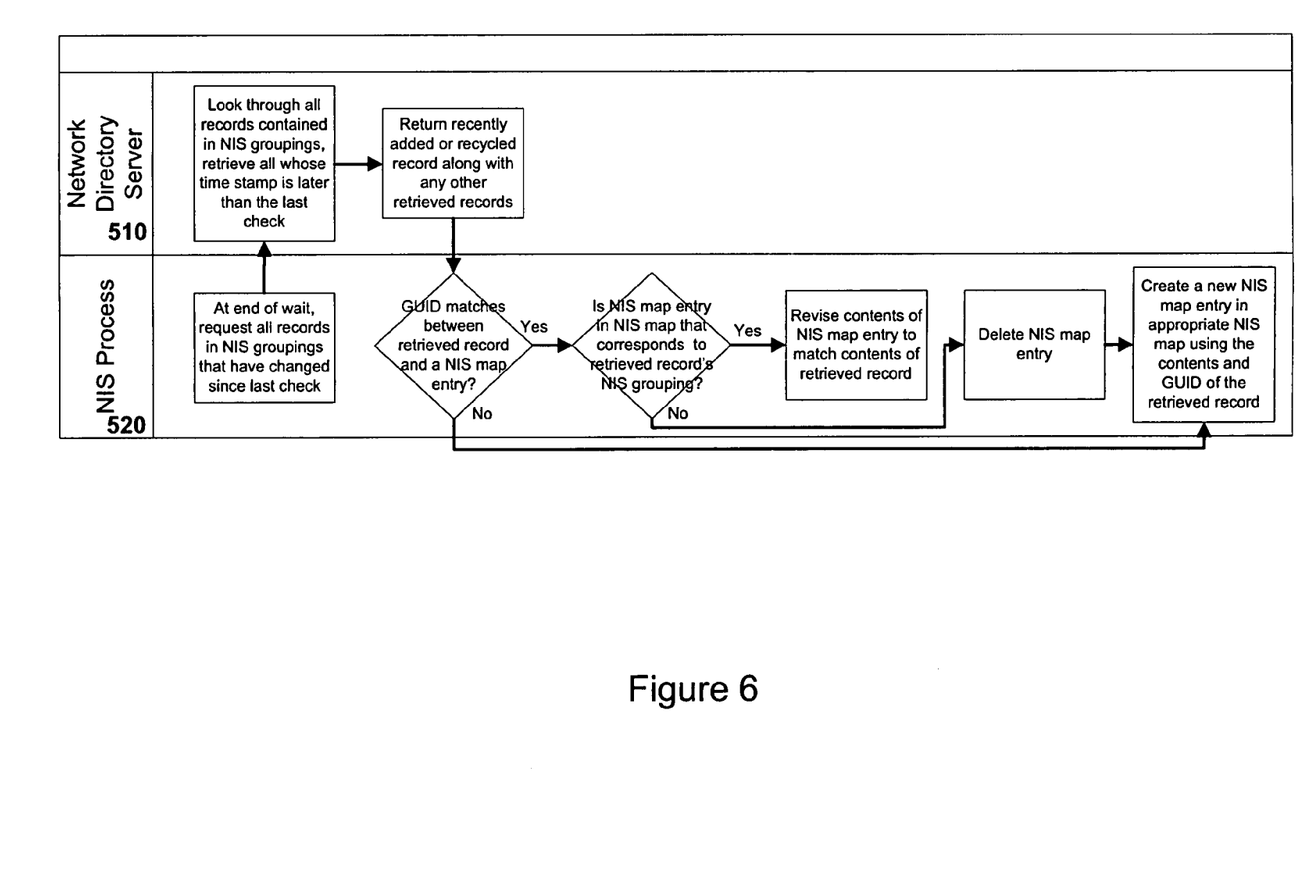
FIG. 6 illustrates the process that occurs when an embodiment of the invention requests changed network entity records, receives a new or recycled record, and modifies NIS maps to incorporate the record.
Figure 7:
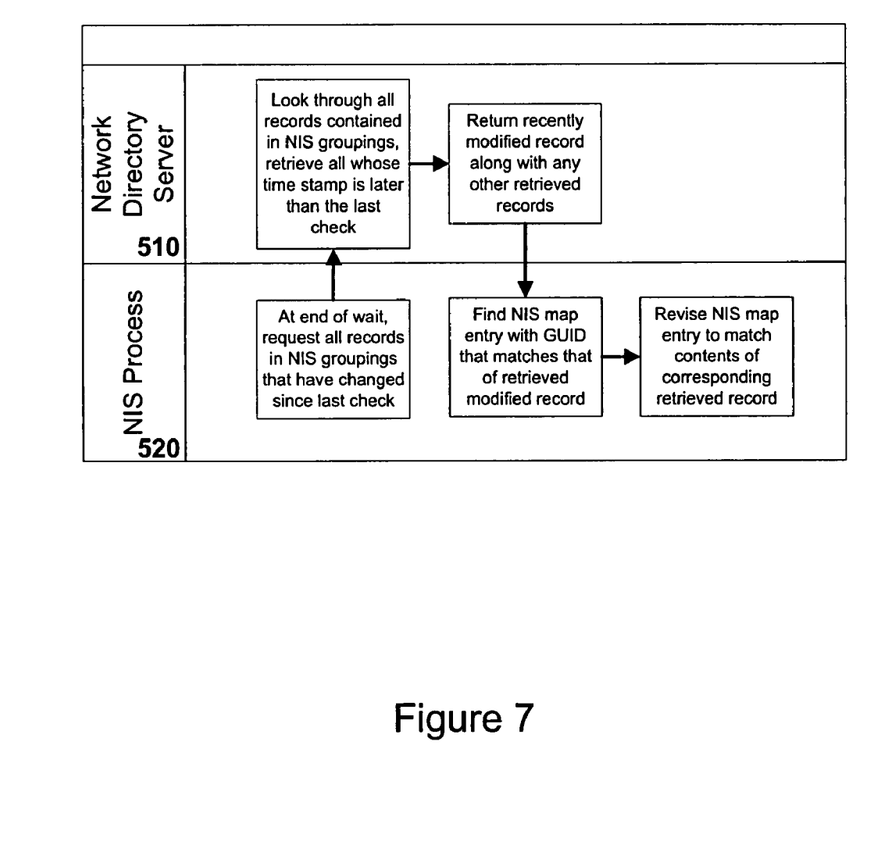
FIG. 7 illustrates the process that occurs when an embodiment of the invention requests changed network entity records, receives a modified record, and modifies an existing NIS map entry to match.
Figure 8:
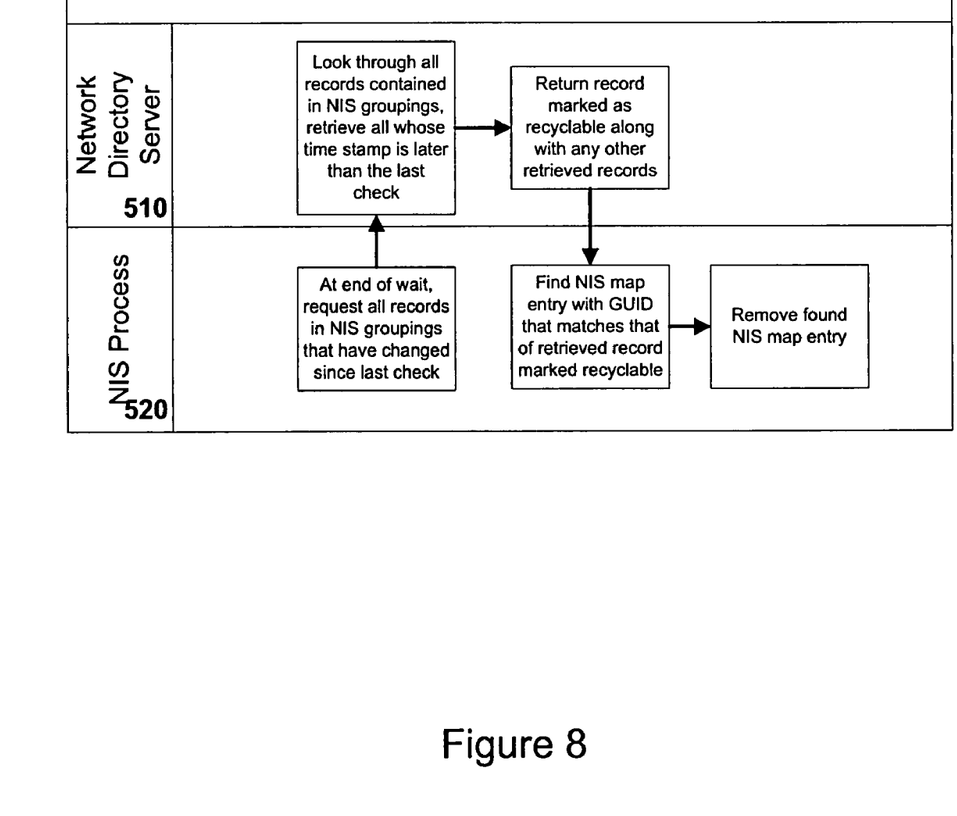
FIG. 8 illustrates the process that occurs when an embodiment of the invention requests changed network entity records, receives an empty recycled record, and modifies NIS maps to delete a corresponding NIS map entry.

FIG. 5 illustrates the processes that occur when a network administrator (410) adds, modifies, and deletes network entity accounts through a record administration interface (420). These account changes leave modified records that are detected by an embodiment of the invention as shown in FIGS. 6, 7, and 8.

The three different types of account changes are separated by vertical dotted lines in the figure. In the left section of the figure, the administrator (410) creates a new account by gathering the information necessary to define a new network entity and then requesting the record administration interface (420) to create a new account using that information. For this example, the new account is a host computer account that includes information such as the computer name and its Internet Protocol (IP) address. The interface checks with the network directory server (430) to see if the network directory database contains any existing records with recycle flags set to show that they can be recycled.

If one or more recyclable records exist, the record administration interface (420) requests that the network directory server (430) modify one of those recyclable records to hold the new account information. The network directory server writes the new host computer account information into the recyclable record, overwriting any old network entity account information that might be present. The network directory server (430) then sets the record's time stamp to reflect the time and/or order in which the record was modified. It also unsets the recycle flag so the record is no longer marked as recyclable.

If no recyclable records exist, the record administration interface (420) requests that the network directory server (430) create a new network entity record. The network directory server creates a new record and writes the new host computer account information into the new record. The server then sets the record's time stamp to reflect the time and/or order in which the record was modified. It unsets the recycle flag so the record is not marked as recyclable.

The record administration interface (420) places the new or modified network entity record into an appropriate NIS grouping.

The middle section of the figure shows the process that occurs when a network administrator (410) modifies an existing network entity account using the record administration interface (420). The interface requests the network directory server (430) to modify the network entity record that corresponds to the account, which it does. The server (430) sets the time stamp of the modified record to reflect the time and/or order in which the record was modified.

The right section of the figure shows the process that occurs when a network administrator (410) deletes a network entity account using the record administration interface (420). The interface requests the network directory server (430) to find the network entity record that corresponds to the account and to set that record's recycle flag to mark the record as recyclable. It does not ask that the record be deleted. The network directory server (430) sets the recycle flag and also sets the time stamp of the modified record to reflect the time and/or order in which the record was modified.

FIG. 6 illustrates the process that occurs when an embodiment of the invention implemented as a NIS process (520) monitors the database to detect a change to at least one of the plurality of information records in the network directory server (510) database that corresponds to the plurality of information records maintained by the embodiment in the NIS server, and when the embodiment updates the copied plurality of information records to reflect the change. In this example, the embodiment detects and retrieves a network entity record for a new network entity account. That record may be a new record containing the account information or a recycled record whose contents have been changed to contain the account information.

The NIS process (520) on the NIS server determines that it is time to check with the network directory server to see if any network entity accounts have changed. The daemon may have an internal timer set to determine a regular interval or it may be triggered by another event.

The NIS process (520) requests that the network directory server return all records in NIS groupings that have changed since the process's last check. For this example, the NIS groupings include a hosts.byname grouping that includes a new host computer record.

The network directory server (510) searches through all records in its groupings to find those with a time stamp that indicates that the record has been changed since the NIS process's (520) last check. The server (510) then returns those changed records to the NIS process (520). In this example those records include the record for the new host computer account created earlier by a network administrator. The record may be either a new record or a recycled record.

When the NIS process (520) receives the new host computer record, the process reads the record's GUID. It looks for a match for that GUID within the NIS entries in the NIS tables that it maintains.

If it finds a match and the NIS entry is in the NIS map that corresponds to the retrieved entity record's NIS grouping, it revises the NIS entries to contain the new entity account information.

If it finds a match and the NIS is in a NIS map that does not correspond to the retrieved entity record's NIS grouping, it deletes the NIS entry and creates a new NIS entry in the NIS map that corresponds to the retrieved record's NIS grouping.

If the process (520) does not find a GUID match among any entries, it creates a new NIS entry in the NIS map that corresponds to the retrieved record's NIS grouping.

For example, the new host computer account record might contain a GUID that was formerly used for a services account. The NIS process (520) finds the GUID in a NIS entry in a services NIS map. It deletes that entry. It then creates a new NIS entry in the hosts.byname NIS map because the retrieved host computer record came from the hosts.byname NIS grouping on the network directory server.

Note that the NIS process (520) performs the same process for each of the new or recycled records it retrieves. When it is finished with its update process, it records the latest time stamp contained in any of the records it received, or it notes the time through another method. It supplies this stored time stamp the next time it checks for updates so the network directory server (510) can find records that were modified after that time stamp.

FIG. 7 illustrates the process that occurs when an embodiment of the invention implemented as a NIS process (520) monitors the database to detect a change to at least one of the plurality of information records in the network directory server (510) database that corresponds to the plurality of information records maintained by the embodiment in the NIS server, and when the embodiment updates the copied plurality of information records to reflect the change. In this example, the embodiment detects and retrieves a modified network entity record that was revised to contain changed network entity account data.

The NIS process (520) on the NIS server determines that it is time to check with the network directory server to see if any network entity accounts have changed. The process may have an internal timer set to determine a regular interval or it may be triggered by another event.

The NIS process (520) requests that the network directory server return all records in NIS groupings that have changed since the process's last check. For this example, the NIS groupings include a hosts.byname grouping that includes the modified host computer record.

The network directory server (510) searches through all records in its groupings to find those with a time stamp that indicates that the record has been modified since the NIS process's (520) last check. The server (510) then returns those modified records to the NIS process (520). In this example those records include the modified host computer record.

When the NIS process (520) receives the modified entity record, the process reads the record's GUID. It looks for a match for that GUID within the NIS entries in the NIS tables that it maintains. When it finds one, it revises it to match the account information in the retrieved record.

FIG. 8 illustrates the process that occurs when an embodiment of the invention implemented as a NIS process (520) monitors the database to detect a change to at least one of the plurality of information records in the network directory server (510) database that corresponds to the plurality of information records maintained by the embodiment in the NIS server, and when the embodiment updates the copied plurality of information records to reflect the change. In this example, the embodiment detects and retrieves a modified network entity record that was marked recyclable after its network entity account was deleted.

the NIS process (520) determines that it is time to check with the network directory server to see if any network entity accounts have changed. The process may have an internal timer set to determine a regular interval or it may be triggered by another event.

The NIS process (520) requests that the network directory server return all records in NIS groupings that have changed since the process's last check. For this example, the NIS groupings include a hosts.byname grouping that includes the host computer record marked as recyclable because its corresponding host computer account was deleted.

The network directory server searches through all records of the requested types to find those with a time stamp that indicates that the record has been modified since the process's last check. The server (510) then returns those modified records to the NIS process (520). In this example those records include the record marked as recyclable.

When the NIS process (520) receives the entity record marked for recycling, the process reads the record's GUID. It looks for a match for that GUID within the NIS entries in the NIS tables that it maintains. When it finds one, it removes that entry from its NIS map.

Figure 9:
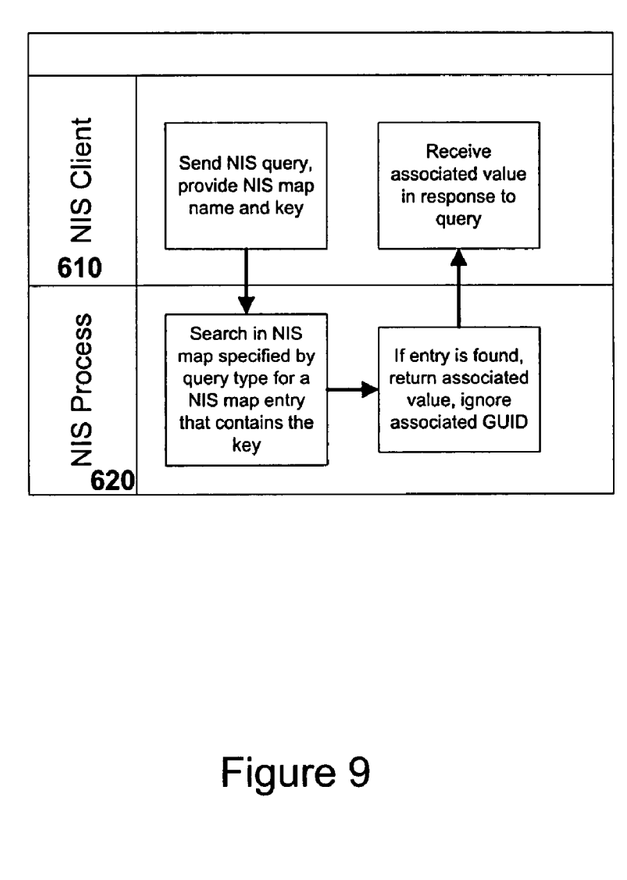
FIG. 9 illustrates the process that occurs when an embodiment of the invention responds to a NIS query from a NIS client.

FIG. 9 illustrates the process that occurs when an embodiment of the invention implemented as a NIS process (620) receives a NIS request from a NIS client (610) on the network, locates data corresponding to the request among the copied plurality of information records, and transmits a NIS response containing data from one of the copied plurality of information records to the NIS client.

The NIS client (610) sends a NIS request to the process (620); the request includes a map name and a key. The process uses the map name and key to determine which NIS map to search, then looks for an entry that matches the key. If it finds a matching entry, it returns the value associated with it.

A NIS client (610) may also ask for a sequence of NIS map entries by sending a sequence of NIS queries. The NIS queries after the first query need not supply a key; they need only ask for the next entry in the map. In this case, the NIS client (610) steps through the entries in the NIS map in the order in which they're stored.

The GUID in each NIS map entry is used only for internal NIS map maintenance. It is never returned in response to a standard NIS query.

Another implementation of this invention may not read locally accessible NIS maps at all, but may request NIS map entry information directly from the network directory server.

Figure 10:
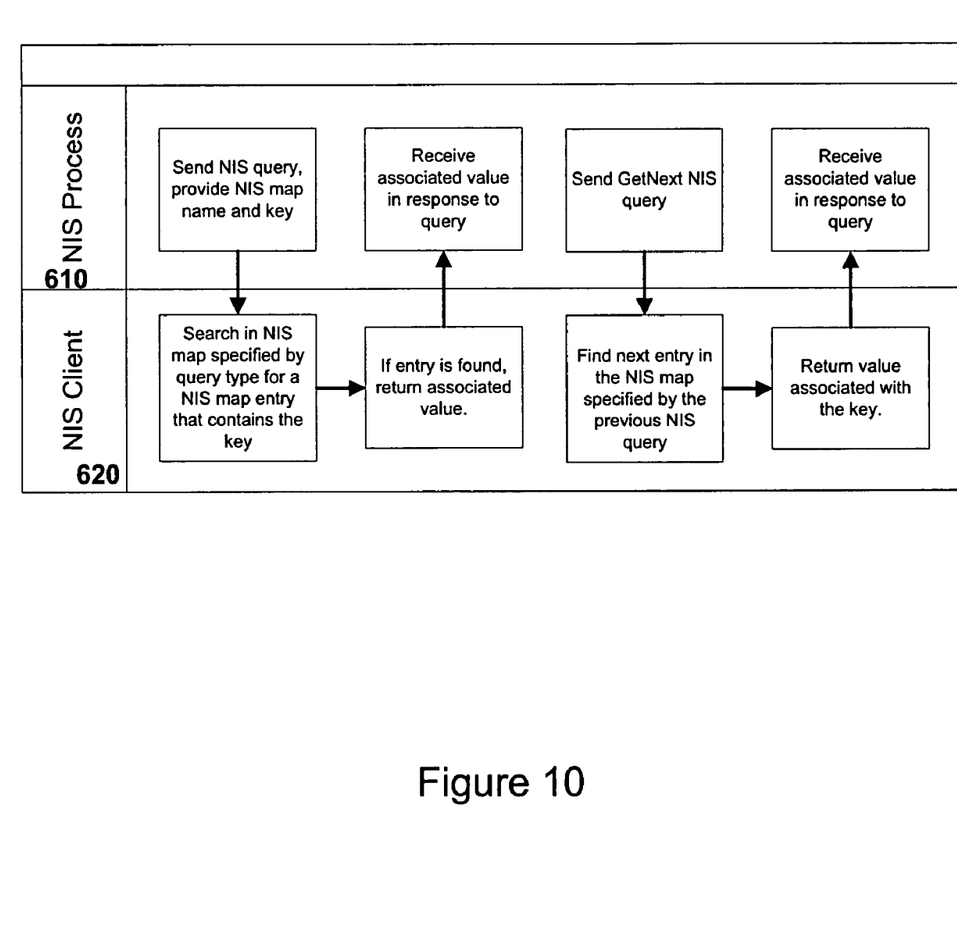
FIG. 10 illustrates the process that occurs when an embodiment of the invention responds to two NIS requests asking for sequential NIS entries within a NIS map.

FIG. 10 illustrates the process that occurs when an embodiment of the invention receives a first NIS request followed by a second NIS request to obtain data related to data sought by the first request. In this case, the second request is the standard NIS request GetNext that asks for the NIS map entry following the NIS map entry returned in reply to the first NIS request.

A NIS client (610) sends a NIS request to the NIS process (620). The NIS request specifies a NIS map and a key. The NIS process (620) locates the specified NIS map, finds the key in the map, and returns the associated value to the NIS client (610).

The NIS client (610) now sends a second GetNext NIS request that asks for the entry in the same NIS map that immediately follows the previously requested entry. The NIS process (620) reads the entry immediately following the previously requested entry and returns its value to the NIS client (610).

Because the NIS client (610) stores NIS maps that contain entries in a clearly defined order, it can respond correctly to NIS requests for subsequent NIS map entries.

Another embodiment of the invention does not store locally-accessible NIS maps but instead requests and receives NIS entries directly from the network directory server database. In this embodiment, each network entity record in the database has a unique index number that determines its order within a NIS map. When the embodiment receives a GetNext request after a previous NIS request, it requests the information record with the next index number for the specified NIS map. The network directory server returns that record and the embodiment returns the appropriate data as a response to the NIS request.

Figure 11:
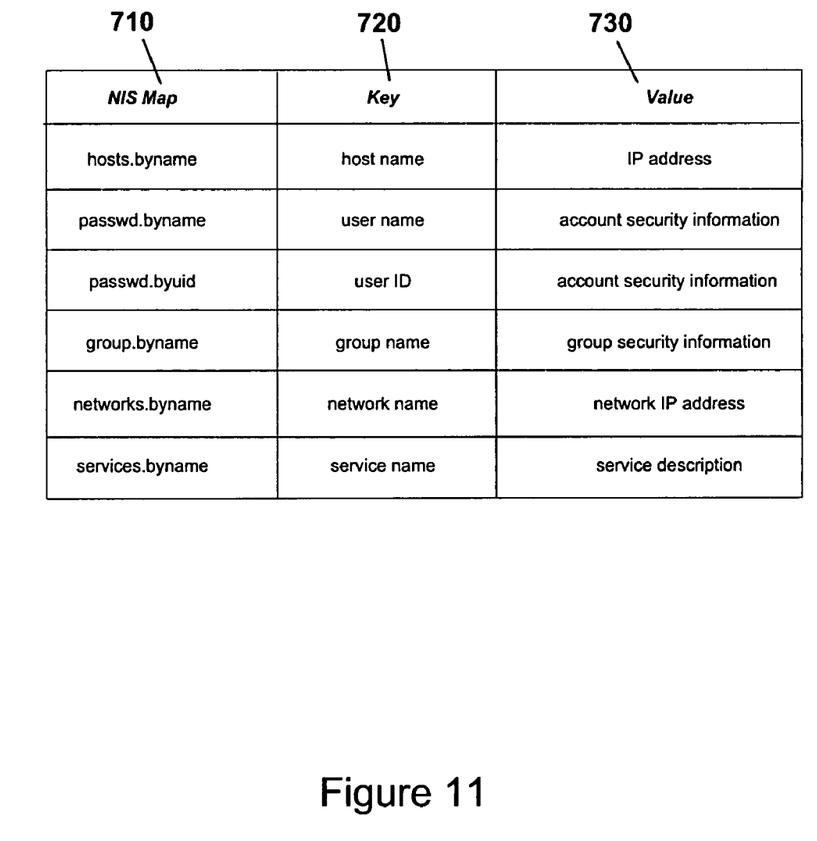
FIG. 11 illustrates some of the common NIS map types that an embodiment of the invention may maintain and provides the key and value used in each NIS map type.

FIG. 11 provides a table of common NIS maps that an embodiment of the invention may maintain and use to respond to NIS requests from NIS clients. The NIS map column (710) provides the name of the NIS map. The key column (720) provides the value used as a key for that NIS map; the key column (730) provides the value used as a value for that NIS map.

The information records that an embodiment of the invention copies from the network directory server database and maintains to provide NIS service may each contain key and value data for any one of these NIS map types or for any number of other possible NIS maps.

An embodiment of the invention may be a machine-readable medium having stored thereon instructions which cause a processor to perform operations as described above. In other embodiments, the operations might be performed by specific hardware components that contain hardwired logic. Those operations might alternatively be performed by any combination of programmed computer components and custom hardware components.

A machine-readable medium may include any mechanism for storing information in a form readable by a machine (e.g., a computer), including but not limited to Compact Disc Read-Only Memory (CD-ROMs), Read-Only Memory (ROMs), Random Access Memory (RAM), Erasable Programmable Read-Only Memory (EPROM).

The applications of the present invention have been described largely by reference to specific examples and in terms of particular allocations of functionality to certain hardware and/or software components. However, those of skill in the art will recognize that dynamic, incrementally-updated NIS maps can also be maintained and served by software and hardware that distribute the functions of embodiments of this invention differently than herein described. Such variations and implementations are understood to be captured according to the following claims.

We claim:

1. A method comprising:
copying a plurality of information records from a network directory database to a Network Information Service ("NIS") map;
monitoring the database to detect a change to at least one of the plurality of information records;
if a change is detected, updating only a portion of the NIS map necessary to reflect the change to the at least one information record;
receiving a NIS map request from a client;
locating data corresponding to the request in the NIS map; and
transmitting a NIS response containing data from the NIS map to the client,
wherein said monitoring the database comprises:
obtaining a first time stamp of a last modification of a database record;
periodically obtaining a second time stamp of the last modification of a database record; and
comparing the first time stamp to the second time stamp.

2. The method of claim 1 wherein one information record contains a host name and an Internet Protocol ("IP") address, or a user name and a password, or a user ID and a password.

3. The method of claim 1 wherein one information record contains a group name and group security information, a network name and a network IP address, or a service name and a service description.

4. The method of claim 1 wherein the NIS request is a first NIS request to obtain information about a first username and the NIS response is a first NIS response, the method further comprising:
receiving a second NIS request from the client to obtain information about a next username;
locating the next username among the copied plurality of information records; and
transmitting a second NIS response containing data about the next user name.

5. The method of claim 1 wherein copying a plurality of information records from a network directory database comprises:
preparing a Lightweight Directory Access Protocol ("LDAP") request;
transmitting the LDAP request to an LDAP server; and
receiving a response including the plurality of information records from the LDAP server.

6. The method of claim 1 wherein copying a plurality of information records from a network directory database comprises:
preparing a Microsoft Active Directory ("AD") request;
transmitting the AD request to an AD server; and
receiving a response including the plurality of information records from the AD server.

7. The method of claim 1 wherein copying a plurality of information records from a network directory database comprises:
preparing a request for a relational database;
transmitting the request to a relational database server; and
receiving a response including the plurality of information records from the relational database server.

8. A non-transitory computer-readable medium containing instructions that, when executed by a general-purpose computing system, cause the system to perform operations comprising:
copying a plurality of information records from a database;
monitoring the database to detect a change to at least one of the plurality of information records;
if a change is detected, updating only a portion of the copied plurality of information records necessary to reflect the change to the at least one information record;
receiving a Network Information Service ("NIS") request from a client;
locating data corresponding to the request among the copied plurality of information records; and
transmitting a NIS response containing data from one of the copied plurality of information records to the client
wherein said monitoring the database comprises:
obtaining a first time stamp of a last modification of a database record;
periodically obtaining a second time stamp of the last modification of a database record; and
comparing the first time stamp to the second timestamp.

9. The non-transitory computer-readable medium of claim 8 wherein one information record contains a host name and art Internet Protocol ("IP") address, or a user name and a password, or a user ID and a password.

10. The non transitory computer-readable medium of claim 8 wherein one information record contains a group name and group security information, or a network name and a network IP address, or a service name and a service description.

11. The non-transitory computer-readable medium of claim 8 wherein the NIS request is a first NIS request to obtain information about a first username and the NIS response is a first NIS response, the computer-readable medium performing further operations comprising:
- receiving a second NIS request from the client to obtain information about a next username;
- locating the next username among the copied plurality of information records; and
- transmitting a second NIS response containing data about the next user name.

12. The non-transitory computer-readable medium of claim 8 wherein copying a plurality of information records from a database comprises:
- preparing a Lightweight Directory Access Protocol ("LDAP") request;
- transmitting the LDAP request to an LDAP server; and
- receiving a response including the plurality of information records from the LDAP server.

13. The non-transitory computer-readable medium of claim 8 wherein copying a plurality of information records from a database comprises:
- preparing a Microsoft Active Directory ("AD") request;
- transmitting the AD request to an AD server; and
- receiving a response including the plurality of information records from the AD server.

14. The non-transitory computer-readable medium of claim 8 wherein copying a plurality of information records from a database comprises:
- preparing a request for a relational database;
- transmitting the request to a relational database server; and
- receiving a response including the plurality of information records from the relational database server.

15. The non-transitory computer-readable medium of claim 8 wherein updating the copied plurality of information records comprises:
- retrieving from the database only information records that are different from records in the copied plurality of information records.

16. The non-transitory computer-readable medium of claim 8 wherein updating the copied plurality of information records comprises:
- removing from the copied plurality of information records information records that do not exist in the database.

* * * * *